Sept. 29, 1925.  K. J. E. HESSELMAN  1,555,204
INTERNAL COMBUSTION ENGINE
Filed July 28, 1922
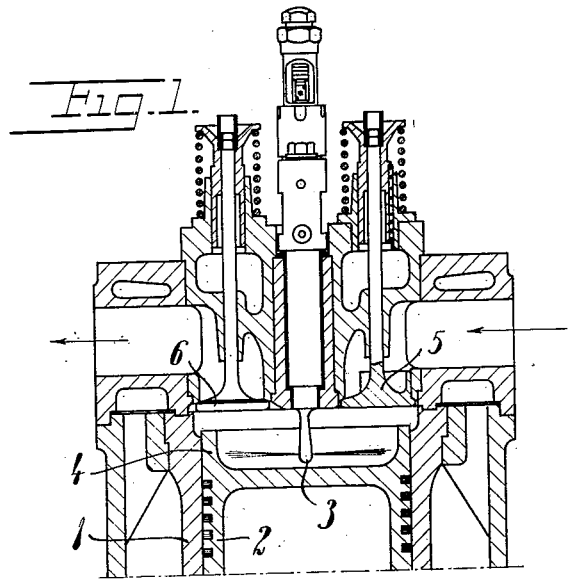
Fig.1.
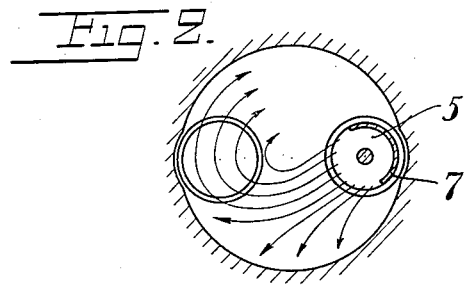
Fig.2.
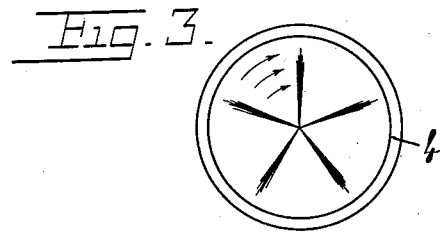
Fig.3.
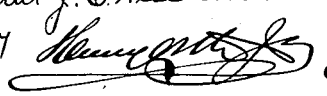

Patented Sept. 29, 1925.

1,555,204

UNITED STATES PATENT OFFICE.

KNUT JONAS ELIAS HESSELMAN, OF SALTSJO-STORANGEN, SWEDEN.

INTERNAL-COMBUSTION ENGINE.

Application filed July 28, 1922. Serial No. 578,251.

*To all whom it may concern:*

Be it known that I, KNUT JONAS ELIAS HESSELMAN, a citizen of the Kingdom of Sweden, residing at Saltsjo-Storangen, Sweden, have invented new and useful Improvements in Internal-Combustion Engines, of which the following is a specification.

This invention relates to internal combustion engines of the kind in which the ignition is produced by the heat of compression and in which the combustion chamber is situated between the piston head and the cylinder cover and is supplied with fuel through a centrally arranged distributing nozzle. In such internal combustion engines of the Diesel type the shape of the combustion chamber is generally more or less semispherical with the distributing nozzle placed at the centre of said chamber. A similar arrangement is generally used in that type of Diesel engines also in which the oil is injected directly without the aid of compressed air. This method of injection, however, is less suitable, as it only permits an incomplete mixing of the oil with the combustion air. A far more complete mixing will be obtained according to this invention by the fact that the fuel injecting nozzle extends into the combustion chamber so as to be in close proximity to the piston head at the inner or upper dead centre. This renders it possible to inject the fuel in a layer parallel to the surface of the piston head and in close proximity thereto, an air space at the same time existing between said fuel layer and the cylinder cover.

In the accompanying drawing—

Figure 1 is a vertical section of the upper portion of an engine constructed according to the invention, Fig. 2 is a diagrammatic horizontal section showing the injection of the combustion air, and Fig. 3 is a diagrammatic top plan view of the piston showing the injection of the fuel.

With reference to the drawing the numeral 1 indicates the cylinder and 2 the piston of an internal combustion engine. Inserted in the plane of the cylinder cover at the centre thereof is an injecting nozzle 3. 5 designates an air inlet valve and 6 the exhaust valve. The air inlet valve is so shaped as to cause the air when entering to rotate within the cylinder. To this end the valve 5 may be formed with a flange 7 extending around a certain part of the periphery of the valve, as shown in Fig. 2, so as to cause the air to enter the cylinder in a substantially tangential direction. The nozzle 3 extends so far into the combustion chamber as to be in close proximity to the piston head at the innermost or uppermost position of the piston, while a comparatively large space at the same time exists between the piston head and the cylinder cover. The nozzle 3 is so designated as to eject the fuel oil in a layer parallel to the piston head or in the shape of a plurality of jets, the lower limiting generatrices of which lie in a plane parallel to the piston head. Above said layer or said jets there is a comparatively large free space in which air is stored. When the piston descends during the injection, the air contained in said space will pass through the more or less continuous fuel layer and will be thoroughly impregnated with fuel.

The piston is formed with a flange 4 in the extension of the piston wall to prevent the fuel injected from touching the comparatively cold cylinder wall which would otherwise result in a cooling of the fuel. For the same purpose the speed of injection of the fuel is adjusted to correspond to the speed of evaporation of the fuel in order to cause the fuel to evaporate before reaching the cylinder wall.

A still more improved mixing of the air with the fuel may be obtained by combining the construction shown with means to cause the air to rotate around the cylinder axis.

What I claim is:—

1. In an internal combustion engine in which the ignition is produced by the heat of compression and in which a combustion chamber of substantially the same diameter as that of the piston is situated between the piston head and the cylinder cover and is supplied with fuel through a centrally arranged distributing nozzle, the combination with the combustion chamber, of a stationary distributing nozzle so mounted as to constantly extend to a certain definite distance into the said chamber corresponding substantially to the distance between the cylinder cover and the piston in the innermost position of the latter, said nozzle being constructed to eject the fuel in the form of separate spaced jets substantially parallel to the said bottom and in proximity thereto, so as to leave a free air space between itself and the cylinder head, and means to cause the contents of the combustion chamber to rotate around the cylinder axis.

2. In an internal combustion engine in which the ignition is produced by the heat of compression and in which the combustion chamber is situated between the piston head and the cylinder cover and is supplied with fuel through a centrally arranged distributing nozzle; the combination with a cup-shaped piston head the wall of which bears against the cylinder wall; of a distributing nozzle extending so far into the combustion chamber as corresponds to the depth of said cup-shaped piston head in close proximity to the bottom of the cup-shaped piston head at the innermost position of the piston, said nozzle constructed to eject the fuel in a layer substantially parallel to the said bottom and in close proximity thereto, and means to cause the contents of the combustion chamber to rotate around the cylinder axis.

In testimony whereof I have signed my name.

KNUT JONAS ELIAS HESSELMAN.